US012798221B2

(12) United States Patent
Kalwa et al.

(10) Patent No.: US 12,798,221 B2
(45) Date of Patent: Nov. 17, 2026

(54) BINDER COMPOSITION AND METHOD FOR MANUFACTURING A WOOD-BASED MATERIAL AND WOOD-BASED MATERIAL

(71) Applicant: SWISS KRONO TEC AG, Lucerne (CH)

(72) Inventors: Norbert Kalwa, Horn-Bad Meinberg (DE); Georg Seidack, Wittstock / Dosse (DE)

(73) Assignee: SWISS KRONO TEC AG, Lucerne (CH)

( * ) Notice: Subject to any disclaimer, the term of this patent is extended or adjusted under 35 U.S.C. 154(b) by 159 days.

(21) Appl. No.: 18/686,966

(22) PCT Filed: Aug. 11, 2022

(86) PCT No.: PCT/EP2022/072566

§ 371 (c)(1),
(2) Date: Feb. 27, 2024

(87) PCT Pub. No.: WO2023/025598

PCT Pub. Date: Mar. 2, 2023

(65) Prior Publication Data

US 2024/0424767 A1 Dec. 26, 2024

(30) Foreign Application Priority Data

Aug. 27, 2021 (EP) .................................... 21193584

(51) Int. Cl.
*B32B 21/13* (2006.01)
*B32B 21/02* (2006.01)

(52) U.S. Cl.
CPC .............. *B32B 21/13* (2013.01); *B32B 21/02* (2013.01); *B32B 2260/046* (2013.01); *B32B 2317/16* (2013.01)

(58) Field of Classification Search
None
See application file for complete search history.

(56) References Cited

U.S. PATENT DOCUMENTS

2006/0264519 A1 11/2006 Eckert et al.

FOREIGN PATENT DOCUMENTS

| | | | | |
|---|---|---|---|---|
| CN | 108929636 A | * 12/2018 | ............. C09J 11/08 |
| DE | 2336381 A1 | 2/1975 | |
| DE | 102007062316 A1 | 6/2009 | |
| DE | 102017108078 A1 | * 10/2018 | ........... B32B 29/002 |
| JP | 2017122148 A | * 7/2017 | |
| WO | 0046306 A1 | 8/2000 | |

OTHER PUBLICATIONS

Qian, X., High Efficiency Composite Wood Adhesive, Dec. 4, 2018, machine translation of CN 108929636 (Year: 2018).*
Qian, X., High Efficiency Composite Wood Adhesive, Dec. 4, 2018 (Year: 2018).*
Sugawara, K., Adhesive and Molded Sheet, Jul. 13, 2017 (Year: 2017).*
Klyszcz-Nasko, Process for Manufacturing A Lightweight Sandwich Panel, Oct. 18, 2018 (Year: 2018).*
International Search Report and Written Opinion dated Nov. 17, 2022 for corresponding application PCT/EP2022/072566.

* cited by examiner

*Primary Examiner* — Chinessa T. Golden
(74) *Attorney, Agent, or Firm* — Bachman & LaPointe, P.C.

(57) ABSTRACT

The invention relates to a binder composition for manufacturing a wood-based material, in particular a board-shaped wood-based material, a method for manufacturing such a wood-based material and such a wood-based material. In order to provide a binder composition and a method for manufacturing such a wood-based material as well as such a wood-based material, in which the speed of curing of isocyanate binders can be specifically controlled and in particular accelerated, whereby the curing temperature can be lowered on the one hand and kept within a predetermined temperature interval on the other hand, so that an onset of curing can be controlled, thereby ensuring a safe, fast and cost-effective manufacture process without a reduction in product quality, it is provided that the binder composition according to the invention for manufacturing a wood-based material has an organic phase comprising at least one isocyanate binder, an aqueous phase and also a solubilizer for rapidly mixing the two phases and/or for accelerating the curing of the isocyanate binder.

18 Claims, No Drawings

BINDER COMPOSITION AND METHOD FOR MANUFACTURING A WOOD-BASED MATERIAL AND WOOD-BASED MATERIAL

BACKGROUND OF THE INVENTION

The invention relates to a binder composition for manufacturing a wood-based material, in particular a board-shaped wood-based material, a method for manufacturing such a wood-based material and such a wood-based material.

A variety of binder compositions, in particular glues, are used in the manufacture of wood-based materials (HWS). Depending on the application, different binder compositions are favored or are particularly suitable. Binder compositions based on urea/formaldehyde have proven to be particularly suitable for wood-based boards that are later to be used in furniture manufacture or interior design. They are available in large quantities and the boards manufactured with them meet the normative requirements for such boards. In addition, these boards are usually coated and sealed with edges on the narrow surfaces so that the effect of moisture is almost certainly prevented here.

For applications where increased humidity or moisture from adjacent components is to be expected, e.g. floorings, urea-formaldehyde glues, possibly reinforced with melamine, are usually used, whereby the increased requirements are taken into account by increasing the amount of binder composition.

For wood-based boards that are used in areas with high humidity or in direct contact with water, urea-formaldehyde glues reinforced with melamine resin, phenolic resins or polymeric diphenylmethane diisocyanate (PMDI) have proven to be suitable. In addition to the hygric load, these boards are often also subject to static loads. This is taken into account in the standards applicable to the products by testing swelling and flexural strength. For the various applications, plywood, chipboards and OSB (oriented strand boards) are used in particular. These boards are preferably used in the construction sector for structural applications, in the automotive sector and as installation boards.

Although all binders that are not hydrolyzed by moisture or water can generally be used for the wood-based materials described above, polymeric diphenylmethane diisocyanate has proven to be particularly suitable for OSB. The reasons for this are the good water resistance of the binder composition and the fact that it is free of formaldehyde. This is particularly important as OSB is normally used uncoated and also in considerable square meter quantities in relation to the room volume. If boards are used with glues containing formaldehyde, this combination can feed into problems despite the limit value for formaldehyde emissions being complied with.

However, the polymeric diphenylmethane diisocyanate has a serious disadvantage compared to the other binders, as its reactivity can hardly be controlled by the use of hardeners. This is particularly disadvantageous for thicker wood-based boards. While significant increases in manufacture can be achieved with other binder or glue systems by using different amounts of at least one hardener in the top and middle layers, this is not possible with polymeric diphenylmethane diisocyanate.

In addition, a temperature of around 100° C. is required to cure the polymeric diphenylmethane diisocyanate, so that in the case of thick wood-based materials, curing only occurs in the middle of the wood-based material when this temperature is also reached there. A significant disadvantage here is that there is no effective control option for different board thicknesses and a long processing time at high temperature is required due to slow curing inside the wood-based material.

Although it is known that polymeric diphenylmethane diisocyanate or isocyanate can generally be accelerated in their curing with polyols or also with amines, the reaction then already takes place at room temperature, which in the manufacture of wood-based materials leads to systems that can no longer be controlled or at least to precuring and thus to an increased use of glue. This leads to an increase in manufacture costs and at the same time to a reduction in product quality. In addition, this type of curing is very disadvantageous during plant downtimes, as the entire quantity of glued strands from gluing to the press must then be discarded.

DE 10 2007 062 316 A1 already discloses an anhydrous composition having isocyanate groups as an alternative for moisture-curing systems with an NCO component, the disclosed composition being curable without an isocyanate-reactive component. The composition has an “NCO prepolymer” which is produced by the reaction of an ester polyol with an isocyanate. In addition, the composition has at least one quaternary ammonium salt as a catalyst and approximately an equal amount of at least one compound containing epoxide groups as a co-catalyst.

WO 00/46306 A1 describes a system for accelerating the curing of urea-formaldehyde glues. There, methylene di(phenyl isocyanate) (MDI) is mixed with a catalyst in quantities of up to 1.9% by weight of the glue in order to accelerate curing. The catalysts are a variety of compounds based on tin salts and/or amines. These systems are offered under the trade name DABCO with various number additives.

SUMMARY OF THE INVENTION

The invention is based on the technical object of providing a binder composition for manufacturing a wood-based material, in particular a board-shaped wood-based material, a method for manufacturing such a wood-based material and such a wood-based material, in which the speed of curing of isocyanate binders can be specifically controlled and, in particular, accelerated, wherein the curing temperature can be lowered on the one hand and kept within a predetermined temperature interval on the other, so that the start of curing can be controlled, thereby enabling a safe, fast and cost-effective manufacturing process without reducing product quality.

The binder composition according to the invention for the manufacture of a wood-based material, in particular a board-shaped wood-based material, comprises an organic phase having at least one isocyanate binder, an aqueous phase and also a solubilizer for rapidly mixing the two phases and/or for accelerating the curing of the isocyanate binder.

Furthermore, the invention relates to a method for manufacturing a wood-based material, in particular a board-shaped wood-based material, comprising at least the steps of producing and/or providing a fiber and/or chip material, subsequently adding a binder composition, in particular a binder composition according to the invention, to the chip material, wherein the binder composition has an organic phase having at least one isocyanate binder and a second aqueous phase which is not completely miscible with the organic phase, as well as a solubilizer for rapid mixing and/or for accelerating the curing of the isocyanate binder, organic phase and a second aqueous phase which is not completely miscible with the organic phase, and a solubilizer for rapid mixing and/or for accelerating the curing of the isocyanate binder, and finally forming the wood-based material from the glued chip material, in particular manufacturing it by pressing the glued chip material into a board-shaped wood-based material.

The wood-based material according to the invention, in particular manufactured by the method according to the invention, has at least one chip material and at least one cured binder composition, in particular a binder composition according to the invention, in at least one layer of the wood-based material, wherein the binder composition contains at least one bonded and/or cured isocyanate binder and a solubilizer for rapid mixing and/or for accelerating the curing of the isocyanate binder.

Finally, the invention relates to the use of a binder composition according to the present invention with a solubilizer for the manufacture of a wood-based material, in particular a board-shaped wood-based material.

DETAILED DESCRIPTION

The use of a solubilizer in a binder composition of a wood-based material makes it possible in a particularly advantageous manner to specifically control the reactivity and thereby both the speed of curing and the starting temperature of the curing of an isocyanate binder. The invention also makes it possible, in an advantageous manner, to accelerate the curing of the isocyanate binder and in particular of PMDI in a targeted manner or to start the reaction at a lower temperature. In particular, the starting temperature can be set so that the reaction does not already begin at temperatures that are usually present after drying the chip material during gluing, typically around 40° C.

The inventors have recognized that during the curing of the isocyanate binder and PMDI in particular, a preferred reaction is the formation of polyureas by reaction with water, although the isocyanate binder and PMDI in particular can also react with other acidic protons from the wood matrix (cellulose, hemicellulose and lignin). However, the reactions of the organic phase with the water are more difficult due to the different polarity. For example, it is possible to overlay PMDI with water without a significant reaction being observed at the interface. This immiscibility leads to the fact that the reaction between the isocyanate binder and the water only starts at temperatures of around 100° C. at a high reaction rate, whereby the water then has the advantage over other possible reaction partners that water vapor has a high mobility and steric reasons do not represent an obstacle to the reaction. Thus, the advantages of the invention can be achieved by a solubilizer that supports mixing or an emulsion of the two phases.

Due to the reaction of the isocyanate binder with hydroxyl groups during curing, a large number of non-ionic surfactants are not suitable as solubilizers, as they usually have such hydroxyl groups, such as glycols or phenols. Non-ionic sugar-based surfactants are also ruled out for the same reasons.

Since the solubilizer is only involved to a small extent and preferably almost not at all in the reaction of the isocyanate binder during hardening, the solubilizer is advantageously only required in small quantities, so that it has no negative influence on the subsequent technological properties of the wood-based material and in particular of boards. This results in particular from the fact that a solubilizer is generally used in an amount one to two orders of magnitude lower than a hardener commonly used in the prior art. Furthermore, the use of the solubilizer enables the manufacture of a board-shaped wood-based material, in particular with a continuous pressing device, whereby this manufacture can be carried out about 10% faster due to the solubilizer. The solubilizer thus enables a fast, cost-effective and targeted manufacture of high-quality wood-based materials.

A binder composition is understood to be a composition which is intended for the addition and bonding of chip material for a wood-based material, the binder composition preferably being formed in such a way that a wood-based material can be manufactured exclusively from the chip material and the binder composition. In principle, however, it is also possible to add further components, such as additives and fillers, to the wood-based material. The binder composition may already be ready for use and/or be formed from a single component.

Alternatively, however, the binder composition can also be formed from several separately provided components, in particular from two components, which are only brought together and mixed before or during use. In particular, the organic phase can be one component and the aqueous phase the other component, with the solubilizer preferably being contained in the aqueous phase. In addition, however, it is also conceivable that the solubilizer is provided as a salt or dissolved as a further, in particular third, component and/or is only added during use. The ready-to-use binder composition consisting of one or more components that are then already mixed is often also referred to as glue or resin and, accordingly, the application of the binder to the chip material is referred to as gluing.

Furthermore, it is particularly conceivable that the multiple components of the binder composition only come together on the surface of the material to be bonded, in particular the chip material, whereby preferably a first component, in particular an aqueous phase and/or the solubilizer, is first placed on and/or in the chip material and then the organic phase with the at least one isocyanate binder is added.

The wood-based material can in principle be any material, the majority of which, preferably apart from the binder composition, is formed from at least 90% wood, plant fibers and/or a material produced therefrom by bonding several pieces of this material with a binder composition. Preferably, this is at least one chip material. The wood-based material can in principle have any shape, with board-shaped wood-based materials and in particular lignocellulose and/or fiber-containing boards, chipboards and/or coarse chipboards being preferred.

In principle, the chip material can have any plant chips and/or fibers and is preferably formed essentially from plant chips. It is particularly preferred that the chip material is produced from wood. It is particularly preferred that the chip material consists of long strands and/or coarse chips, in particular for the manufacture of a coarse chipboard, also called OSB (oriented strand board). The wood chips produced or provided for the manufacture of an oriented strand board can have a length between 50 to 200 mm, preferably 70 to 180 mm, more preferably 90 to 150 mm; a width between 5 to 50 mm, preferably 10 to 30 mm, more preferably 15 to 20 mm; and a thickness between 0.1 and 2 mm, preferably between 0.3 and 1.5 mm, more preferably between 0.4 and 1 mm. For chipboards, the chip sizes for the top and/or middle layer are preferably in the range of <1 mm to approx. 30 mm.

Although the forming of the wood-based material can in principle be carried out in any way, it is preferably carried out as a continuous process, in particular by spreading the glued chip material onto a conveyor device, in particular onto a conveyor belt, and by pressing the glued chip material into the wood-based material. The forming of the wood-based material and in particular the pressing is preferably carried out under high pressure and/or at a high temperature, preferably of at least 150° C., particularly preferably between 170° C. and 220° C. and very particularly preferably between 180° C. and 220° C.

In particular, it is preferred that the glued chip material is spread alternately lengthwise and crosswise to the manufacture direction in spreading devices for the manufacture of a coarse chipboard, so that the chip material is arranged crosswise, particularly preferably in at least three layers, in particular a lower surface layer, a middle layer and an upper surface layer. The spreading direction of the lower and upper surface layer is preferably the same and/or deviates from the spreading direction of the middle layer. In particular, the spreading direction of the middle layer is preferably different from the spreading direction of the two surface layers. It is generally preferred that the structure of the wood-based material, and in particular of a board-shaped wood-based material, is multi-ply or multi-layered.

In principle, the wood-based material can be homogeneous structured in all spatial directions, although a multi-ply or multi-layered structure is preferably carried out and particularly preferably in different layers, particularly preferably along a spatial direction and in particular especially preferably with respect to the thickness of the wood-based material. The individual layers may differ from one another in particular in their thickness, their density, in the orientation of the chip material, in the composition of the chip material, in the dimensions of the chip material, in the proportion of the binder composition they contain and/or in the chemical composition of the binder composition.

The production of the chip material is preferably carried out by peeling debarked round wood, preferably coniferous wood, in the longitudinal direction and/or by rotating knives. It is also preferred that the chip material produced is dried at high temperatures before the binder is added, in particular to reduce the natural moisture content of the chip material. It is particularly preferred that the moisture content of the chip material after drying is below 10% and most preferably below 7% in order to avoid splitting during subsequent pressing due to strong vapor formation.

The addition of the binder composition to the chip material is preferably a gluing of at least part and preferably all of the chip material as the starting material for the wood-based material. The binder composition is also preferably applied to the chip material in a finely distributed manner. Alternatively, it is conceivable that a first component of the binder composition is applied first and only afterwards the second component. The amount of the binder composition, in particular in the case of the use of PMDI as binder, is preferably 1 to 10% by weight, particularly preferably 2 to 7% by weight, in particular 3% by weight based on the total amount of chip material.

In the case of the wood-based material according to the invention, the binder composition is preferably completely cured after its manufacture, in particular preferably the isocyanate binder has reacted with the water of the aqueous phase to form carbamic acids and/or further to form the corresponding amines and/or polyureas. The cured binder composition preferably consists essentially of polyureas, the solubilizer and/or further components of the organic and/or aqueous phase.

According to the invention, the binder composition has at least one isocyanate binder. In principle, the binder composition can have only one binder or a mixture of several binders, in particular depending on the desired properties of the wood-based material manufactured, whereby the other binders can also be isocyanate binders or any other binders. The proportion of all binders, in particular the isocyanate binder, in the binder composition is preferably between 60% and 99%, particularly preferably at least 70% and very particularly preferably at least 85%. The proportion of water or the proportion of the aqueous phase in the binder composition is preferably between 0 and 15%, more preferably between 0.01 and 10% and most preferably between 0.5 and 8%.

According to the invention, the binder composition has at least one, preferably exactly one, solubilizer, although it is also conceivable in principle to use several chemically different solubilizers at the same time. The solubilizer according to the invention basically enables better mixing and/or the formation of an emulsion of the aqueous phase with the organic phase, in particular with the isocyanate binder, whereby the water is then particularly preferably the reactant for curing the binder. Accordingly, the solubilizer preferably enables or promotes a dissolving or mixing of the aqueous phase and the organic phase, whereby the reactants of the reaction for curing the binder come into direct contact and a reaction of the water with the isocyanate can be carried out. In this way, an readily controllable acceleration of the curing of the binder composition is achieved in a simple manner.

Although the solubilizer accelerates the reaction of curing the isocyanate binder, the solubilizer itself is preferably not directly involved in the reaction and/or acts catalytically in the curing of the isocyanate binder. In particular, the solubilizer is preferably selected such that it does not participate in an activation of the isocyanate group of the binder and/or is not consumed during the curing of the binder composition. The solubilizer leads to a lower necessary reaction temperature and/or to a shortened reaction time and also enables good controllability of the reaction kinetics. There is preferably a linear relationship between the gelation time or the duration of curing and the amount of solubilizer used.

According to the invention, the solubilizer has no hydroxyl groups and in particular no acidic and/or alcoholic hydroxyl groups, which could cause the solubilizer to participate as a reactant in the reaction of curing the isocyanate binder and thereby become bound, so that it would no longer be available as a solubilizer. Furthermore, the solubilizer is preferably ionic, in particular since non-ionic solubilizers are mostly reactive with the isocyanate binder. Solubilizers that have non-ionic and/or hydroxy groups should be avoided in particular, as these usually cause the binder to harden immediately upon addition and/or even at temperatures that are too low, thus leading to undesirable process properties and/or an increased binder requirement.

The aqueous and organic phases are generally not completely miscible, preferably only slightly miscible and particularly preferably-optionally except for very small amounts-immiscible. Accordingly, the binder composition, at least at the time of addition of the binder composition to a chip material, is preferably a multiphase mixture and/or an emulsion, which can be both stable in the long term and can segregate again over time.

Although the binder composition according to the invention may comprise any solubilizer, it is preferred that the solubilizer is an surface-active substance and/or reduces the interfacial tension between the aqueous phase and the organic phase in order to enable faster and/or better mixing of the two phases. A preferred embodiment of the binder composition according to the invention further provides that the solubilizer has an ionic surfactant, preferably based on organic and particularly preferably aromatic compounds, and is particularly preferably such a surfactant.

A particularly preferred embodiment of the binder composition according to the invention is one in which the solubilizer has a sulfonic acid derivative or salt and is preferably a sulfonic acid derivative or salt. Accordingly, the solubilizer is preferably an organic salt and/or preferably has a polar and a non-polar region. The non-polar region is particularly preferably formed essentially from aliphatic hydrocarbons and in particular essentially from alkanes or as an alkyl group, a long-chain and/or essentially unbranched alkyl radical being preferred. The polar region preferably has a sulfonate group, a carboxyl group, an ester group, a keto group and/or another oxygen-rich functional group.

Preferably, the solubilizer is an ionic substance and particularly preferably has an organic anion, which can be either singly or multiply charged. Accordingly, the solubilizer preferably has at least one counterion and particularly preferably exactly one counterion and/or several chemically identical counterions. The counterion is also preferably a cation, which is particularly preferably singly positively charged. Furthermore, the cation is particularly preferably an alkali metal cation and especially preferably a sodium ion. Accordingly, the solubilizer is preferably a sodium salt or is present in the form of a sodium salt. Alternatively, the solubilizer may also be present in solution, in particular as a dissolved sodium salt.

Particularly preferred is an embodiment of the binder composition according to the invention with one or more solubilizers from the group consisting of N,N-naphthalene sulfonic acid, dodecane sulfonic acid or dodecylbenzene sulfonic acid and/or the respective sodium salt, in particular N,N-naphthalene sulphonate, dodecane sulphonate, dodecylbenzene sulphonate or sodium sulphosuccinate, which is also known as sulphosuccinic acid bis-2-ethylhexyl ester or docusate sodium.

Although any isocyanate binder may be present in the binder composition and preferably forms its main binder, it is preferred that the isocyanate binder comprises polymeric diphenylmethane diisocyanate (PMDI) and in particular is polymeric diphenylmethane diisocyanate. Most preferably, the diphenylmethane diisocyanate is the only isocyanate binder and more preferably generally the only binder in the binder composition. In principle, however, it is also possible to use, for example, toluene-2,4-diisocyanate (TDI), hexamethylene diisocyanate (HDI), methylene diphenyl diisocyanate (MDI), meta-tetramethylxylylene diisocyanate (TMXDI), isophorone diisocyanate (IPDI) and/or 4,4'-diisocyanatodicyclohexylmethane (H12MDI) or another isocyanate are conceivable as isocyanate binders individually or in combination, in particular with polymeric diphenylmethane diisocyanate (PMDI).

According to an advantageous further development of the binder composition according to the invention, the binder composition is formaldehyde-free and/or does not release formaldehyde before, during or after curing, which makes it particularly suitable for indoor use.

In order to achieve a good effect of the solubilizer, the solubilizer is preferably highly water-soluble and/or readily dispersible in water. The solubilizer is preferably used or prepared in an aqueous solution or a dispersion in water with a mass fraction of preferably at least 25%, particularly preferably at least 50%, very particularly preferably at least 60% and particularly preferably at least 70% and then added to the binder composition, the aqueous phase of the binder composition and/or the chip material.

In an advantageous embodiment of the binder composition according to the invention, the proportion of the solubilizer is 0.01% to 5%, preferably 0.02% to 2%, particularly preferably 0.05% to 1.0% and very particularly preferably 0.1% to 0.5% based on the mass of the isocyanate binder. The amount of solubilizer added to the binder composition is essential for controlling the reaction rate of the isocyanate binder and/or the curing of the binder. Alternatively or additionally, control can be carried out by adjusting or adapting the temperature.

A preferred further development of the method according to the invention for manufacturing a wood-based material provides that the addition of the binder composition to the chip material for at least one layer and preferably all layers of the wood-based material is carried out in the form of an addition of two separate components of the binder composition, one component being the organic phase comprising the isocyanate binder and the other component being the aqueous phase and/or a paraffin emulsion in which the solubilizer is contained, in particular dissolved. The addition of the solubilizer to the aqueous phase or to the paraffin emulsion is also preferably carried out as a highly concentrated solution with a solubilizer mass fraction of at least 70%. It is also preferred that the two components of the binder composition get in contact on the surface of the chip material. In addition or alternatively, one of the components, in particular the aqueous phase and/or the solubilizer, can also be added to the chip material first and, in particular, applied evenly to its surface and then the second component, in particular the isocyanate binder or the organic phase, can be added. This is preferably carried out in a glue drum or in a trough mixer. Alternatively, it is also possible that the binder composition consisting of at least two and preferably exactly two components is only combined immediately before being added to the chip material, preferably by mixing the organic phase and the aqueous phase, in particular with the solubilizer, into one another. This can be carried out upstream of the glue drum or the trough mixer with the aid of a static mixer, for example.

According to the invention, the wood-based material has at least one layer, wherein a structure in several layers and in particular in at least three layers, in particular a lower surface layer, a middle layer and an upper surface layer, is advantageous. Furthermore, preferably at least one of the layers, preferably the middle layer, has a binder composition with a solubilizer and at least one other layer, preferably the lower or the upper surface layer and particularly preferably the lower and the upper surface layer, has a binder composition without solubilizer. It is generally preferred that only a single layer, in particular a middle layer, or only all layers arranged in the interior of the wood-based material and/or not forming a surface layer have a binder composition with a solubilizer.

Finally, an advantageous embodiment of the wood-based material according to the invention has a structure with at least three layers, in particular at least one lower surface layer, a middle layer and an upper surface layer, wherein at least two of the layers, preferably including the middle layer, and particularly preferably all layers have a binder composition with a solubilizer, wherein the proportion of the solubilizer in the middle layer is higher than in the surface layers. A different proportion of the solubilizer can be used to take into account the different rates of heat input, especially when pressing wood-based boards, and thus ensure particularly uniform curing of the binder over the entire thickness of the wood-based material. Particularly preferably, the proportion of the solubilizer increases from the surface layers towards the layers in the middle of the wood-based material. Preferably, the proportion of solubilizer in a middle layer is between 5% and 500%, particularly preferably between 10% and 200% and most preferably between 20% and 100% higher than the proportion of solubilizer in a surface layer, in particular in both surface layers.

The invention is explained in more detail below on the basis of several comparative tests and in the form of exemplary embodiments.

Exemplary Embodiment 1

In a test tube, 20 ml of water containing an amount of a solubilizer specified in Table 1 is overlaid with the same amount of polymeric diphenylmethane diisocyanate (PMDI), an isocyanate binder, as the organic phase. The sodium salts of N,N-naphthalene sulfonic acid and dodecane sulfonic acid as well as dodecylbenzene sulfonate as a sodium salt and diethylbenzyl sodium sulfosuccinate are used as solubilizers. The test tube is then transferred to a water bath, which is brought to the temperature specified in column 4 of Table 1 with the aid of a heating plate located underneath. The gelation time is determined at regular intervals by dipping a glass rod into the PMDI. The gelation time is considered to have been reached when the PMDI has a solid, crumbly consistency rather than a liquid consistency when immersed.

TABLE 1

Comparative tests without and with different solubilizers

| No. | Catalyst | Catalyst in % related to PMDI | T in ° C. | Gelation time in min |
|---|---|---|---|---|
| 1 | — | 0 | 40 | 41:01 |
| 2 | N,N-Naphthalene sulfonic acid sodium salt | 0.1 | 40 | 39:32 |
| 3 | Dodecane sulfonic acid sodium salt | 0.1 | 40 | 60:00 |
| 4 | Dodecylbenzenesulfonate sodium salt | 0.1 | 40 | 42:23 |
| 5 | Diethylbenzyl sodium sulfosuccinate | 0.1 | 40 | 40:44 |
| 6 | — | 0 | 80 | 12:44 |
| 7 | N,N-Naphthalene sulfonic acid sodium salt | 0.1 | 80 | 7:56 |
| 8 | Dodecane sulfonic acid sodium salt | 0.1 | 80 | 11:44 |
| 9 | Dodecyl benzene sulfonate sodium salt | 0.1 | 80 | 39:45 |
| 10 | Diethylbenzyl sodium sulfosuccinate | 0.1 | 80 | 41:44 |
| 10 | N,N-Naphthalene sulfonic acid sodium salt | 0.2 | 80 | 5:37 |
| 11 | Dodecane sulfonic acid sodium salt | 0.2 | 80 | 10:41 |
| 12 | Dodecyl benzene sulfonate sodium salt | 0.2 | 80 | 8:57 |
| 13 | Diethylbenzyl sodium sulfosuccinate | 0.2 | 80 | 11:09 |
| 14 | N,N-Naphthalene sulfonic acid sodium salt | 0.5 | 80 | 3:55 |
| 15 | Dodecane sulfonic acid sodium salt | 0.5 | 80 | 11:01 |
| 16 | Dodecyl benzene sulfonate sodium salt | 0.5 | 80 | 8:47 |

As can be seen, the addition of an ionic surfactant as a solubilizer significantly reduces the gelling time. This is particularly noticeable at a concentration of 0.5% ionic surfactant on PMDI. Ionic surfactants based on aromatic compounds as the sodium salt, such as the sodium salt of N,N-naphthalene sulfonic acid, are particularly effective. The curing of the PMDI can be precisely controlled by the variable addition of ionic surfactants as solubilizers and thus also as catalysts. Almost no catalysis can be detected at room temperature or slightly elevated temperatures. A particularly positive aspect is that the surfactants have very good water solubility and can therefore be used in the system as a highly concentrated solution (concentration>70% by weight). This is particularly relevant in the middle layer of a multi-layered wood-based material, as no additional water is usually added during the gluing process. The catalyst can then be added there, for example in the form of a paraffin emulsion. Addition of the surfactant can be carried out at any point in the manufacture process onto the chip material or strands or to the PMDI. Dosing in the glue drum (coil) is preferred.

Exemplary Embodiment 2

Beech yokes are placed in a 0.5% by weight solution of N,N-naphthalene sulfonic acid sodium salt in water for one hour with the side that will later be used for bonding. They are then fixed to a second yoke, to which diphenylmethane diisocyanate (PMDI) has been applied in a quantity of approx. 100 g/m$^2$, using a screw and a torque wrench with identical force. Comparative samples without N,N-naphthalenesulfonic acid sodium salt, which were only placed in water, are also tested. The samples are then stored in a drying cabinet at 80° C. Samples and reference samples are taken after 10, 20, 30 and 40 minutes. These samples are quickly cooled to room temperature and then the transverse tensile strength is determined using a testing machine.

TABLE 2

Testing the transverse tensile strength with and without solubilizer

| Curing time in min | Zero sample Transverse tension in N/mm$^2$ | N,N-Naphthalene sulfonic acid sodium salt Transverse tension in N/mm$^2$ |
|---|---|---|
| 10 | 0 | 0.1 |
| 20 | 0.08 | 0.19 |
| 30 | 0.26 | 0.40 |
| 40 | 0.52 | 0.56 |

As can be seen from Table 2, the variant with the solubilizer reacts earlier than the variant without catalyst. With a curing time of 40 minutes, the effect is no longer as pronounced.

Exemplary Embodiment 3

In the manufacture of OSB (Oriented Strand Board), N,N-naphthalene sulfonic acid sodium salt is added to a binder composition containing the isocyanate binder polymeric diphenylmethane diisocyanate (PMDI) in an amount of 0.5% by weight based on the mass of the PMDI as a solubilizer and catalyst. The binder composition is intended for gluing the chip material of a middle layer of the OSB. The solubilizer and catalyst are added as an aqueous solution via a static mixer immediately before the chip material is glued, whereby the volume ratio of the organic phase to the added aqueous phase is 1:0.4.

No solubilizer is added to the organic phase of the binder composition, which comprises PMDI and is intended for gluing the chip material of the surface layers. The respective chip material is then sprayed with the two binder compositions in the glue drum and fed to a Conti press after spreading for an 18 mm board. The speed was gradually increased by 10% compared to manufacture without a catalyst. No splitting or other problems were observed during manufacture. When testing the technological values (transverse tensile strength, swelling), no differences were found compared to manufacture at standard speed.

Exemplary Embodiment 4

A solubilizer, in particular N,N-naphthalene sulfonic acid sodium salt, is used in the top and middle layers of wood-based boards when PMDI is used as a glue. The dosage in the middle layer is higher, as the heat from the press reaches the middle layer with a delay. The solubilizer and catalyst are added as an aqueous solution, with a 0.2% by weight solution being added to the middle layer and a 0.5% by weight solution being added to the surface layers. Otherwise, the manufacture of the wood-based boards is carried out as specified in exemplary embodiment 3. Here, too, the manufacture speed could be increased by approx. 10%.

The invention claimed is:

1. Binder composition for manufacturing a wood-based material, comprising
- an organic phase having at least one isocyanate binder,
- an aqueous phase and
- an ionic and/or alcoholic hydroxy group-free solubilizer for rapid mixing of both phases and/or for accelerating curing of the isocyanate binder, wherein
- the solubilizer is one or more substances from the group consisting of N, N-naphthalene sulfonic acid, dodecanesulfonic acid, diethylbenzyl sodium sulfosuccinate and respective sodium salt thereof, and
- further wherein the binder composition comprises a proportion of the solubilizer of 0.05% to 1.0% based on a mass of the isocyanate binder.

2. Binder composition for manufacturing a wood-based material according to claim 1, wherein the solubilizer is a surface-active substance and/or enables the formation of an emulsion of the two phases.

3. Binder composition for manufacturing a wood-based material according to claim 1, wherein the solubilizer is an ionic surfactant based on aromatic compounds.

4. Binder composition for manufacturing a wood-based material according to claim 1, wherein the solubilizer is a sulfonic acid derivative or sulfonic acid salt.

5. Binder composition for manufacturing a wood-based material according to claim 1, wherein the solubilizer is highly water-soluble such that at least a aqueous solution with a solubilizer mass fraction of 70% can be prepared.

6. Binder composition for manufacturing a wood-based material according to claim 1, wherein the isocyanate binder is polymeric diphenylmethane diisocyanate.

7. Binder composition for manufacturing a wood-based material according to claim 1, wherein the proportion of the solubilizer is 0.1% to 0.5% based on the mass of the isocyanate binder.

8. Binder composition for manufacturing a wood-based material according to claim 1, wherein the solubilizer does not participate in the reaction for curing the isocyanate binder and/or acts catalytically in the curing of the isocyanate binder.

9. Binder composition according to claim 1, wherein the wood-based material is a board-shaped wood-based material.

10. Wood-based material having at least one chip material and at least one cured binder composition in at least one layer of the wood-based material, wherein the binder composition is a binder composition according to claim 1, wherein the binder composition comprises at least one cured isocyanate binder and a solubilizer for rapid mixing and/or for accelerating the curing of the isocyanate binder, wherein the solubilizer is one or more substances selected from the group consisting of N, N-naphthalene sulfonic acid, dodecanesulfonic acid, diethylbenzyl sodium sulfosuccinate and respective sodium salt thereof, and further wherein the binder composition comprises a proportion of the solubilizer of 0.05% to 1.0% based on the mass of the isocyanate binder.

11. Wood-based material according to claim 10, further comprising a structure with at least three layers comprising a lower surface layer, a middle layer and an upper surface layer, wherein at least one of the layers has a binder composition with a solubilizer and at least one further layer has a binder composition without solubilizer.

12. Wood-based material according to claim 11, wherein the at least one of the layers is the middle layer.

13. Wood-based material according to claim 10, further comprising a structure with at least a lower surface layer, a middle layer and an upper surface layer, wherein all layers have a binder composition with a solubilizer, wherein an amount of the solubilizer in the middle layer is higher than in the surface layers.

14. Method for manufacturing a wood-based material, comprising the steps of:
- producing and/or provision of a chip material,
- addition of a binder composition to the chip material, the binder composition having an organic phase comprising at least one isocyanate binder and a second aqueous phase immiscible with the organic phase and solubilizers for rapid mixing and/or for accelerating the curing of the isocyanate binder, wherein the solubilizer is one or more substances selected from the group consisting of N, N-naphthalene sulfonic acid, dodecanesulfonic acid, diethylbenzyl sodium sulfosuccinate and respective sodium salt thereof, and further wherein the binder composition comprises a proportion of the solubilizer of 0.05% to 1.0% based on the mass of the isocyanate binder, and forming the wood-based material from the glued chip material into a board-shaped wood-based material.

15. Method for manufacturing a wood-based material according to claim 14, wherein the addition of the binder composition to the chip material for at least one layer of the wood-based material is carried out in the form of an addition of two separate components of the binder composition, one component being the organic phase having the isocyanate binder and the other component being the aqueous phase and/or a paraffin emulsion in which the solubilizer is dissolved.

16. Method for manufacturing a wood-based material according to claim 14, wherein the addition of the solubilizer to the chip material is carried out in a glue drum and/or simultaneously with the addition of the isocyanate binder and/or the aqueous phase.

17. Method according to claim 14, wherein the wood-based material is a board-shaped wood-based material.

18. Method according to claim 14, wherein the forming step comprises pressing the wood-based material into the board-shaped wood-based material.

* * * * *